United States Patent
Cox et al.

(10) Patent No.: US 7,468,589 B2
(45) Date of Patent: Dec. 23, 2008

(54) LITHOGRAPHIC APPARATUS HAVING A CONTROLLED MOTOR, AND MOTOR CONTROL SYSTEM AND METHOD

(75) Inventors: Henrikus Herman Marie Cox, Eindhoven (NL); Hans Butler, Best (NL); Sven Antoin Johan Hol, Yokahama (JP)

(73) Assignee: ASML Netherlands B.V., Veldhoven (NL)

( * ) Notice: Subject to any disclaimer, the term of this patent is extended or adjusted under 35 U.S.C. 154(b) by 392 days.

(21) Appl. No.: 11/331,337

(22) Filed: Jan. 13, 2006

(65) Prior Publication Data

US 2007/0164697 A1 Jul. 19, 2007

(51) Int. Cl.
*H02K 41/00* (2006.01)
(52) U.S. Cl. ..................................... 318/135
(58) Field of Classification Search ................. 318/135
See application file for complete search history.

(56) References Cited

U.S. PATENT DOCUMENTS

| | | | | |
|---|---|---|---|---|
| 5,120,034 A | * | 6/1992 | Van Engelen et al. | ......... 269/73 |
| 5,157,296 A | * | 10/1992 | Trumper | .................... 310/90.5 |
| 5,477,304 A | * | 12/1995 | Nishi | .......................... 355/53 |
| 5,545,962 A | * | 8/1996 | Wakui | ........................ 318/677 |
| 5,737,063 A | * | 4/1998 | Miyachi | ....................... 355/53 |
| 5,757,149 A | * | 5/1998 | Sato et al. | ................... 318/135 |
| 5,841,250 A | * | 11/1998 | Korenage et al. | ........... 318/135 |
| 6,021,991 A | * | 2/2000 | Mayama et al. | ............. 248/550 |
| 6,172,373 B1 | * | 1/2001 | Hara et al. | .................. 250/548 |
| 6,504,162 B1 | * | 1/2003 | Binnard et al. | ........... 250/492.2 |
| 6,872,958 B2 | * | 3/2005 | Andeen et al. | ........... 250/492.2 |

* cited by examiner

*Primary Examiner*—Burton Mullins
(74) *Attorney, Agent, or Firm*—Pillsbury Winthrop Shaw Pittman LLP

(57) ABSTRACT

A lithographic apparatus includes an illumination system to condition a radiation beam. A patterning support holds a patterning device that imparts the radiation beam with a pattern to form a patterned radiation beam. A substrate support holds a substrate. A projection system projects the patterned radiation beam onto the substrate. A positioning system positions the patterning support and the substrate support. The positioning system has a motor with a stator and a mover coupled to a support, and an associated motor control system with a controller providing an output for controlling currents applied to the motor. The motor control system determines a controller output required to compensate for a weight of mover and associated support, determines a deviation of this output from an output required to compensate the gravity force acting on the mover and associated support, and corrects the currents applied to the motor based on the deviation.

19 Claims, 4 Drawing Sheets

LITHOGRAPHIC APPARATUS HAVING A CONTROLLED MOTOR, AND MOTOR CONTROL SYSTEM AND METHOD

BACKGROUND

1. Field of the Invention

The present invention relates to a lithographic apparatus having a controlled motor, and a motor control system and method.

2. Description of the Related Art

A lithographic apparatus is a machine that applies a desired pattern onto a substrate, usually onto a target portion of the substrate. A lithographic apparatus can be used, for example, in the manufacture of integrated circuits (ICs). In such a case, a patterning device, which is alternatively referred to as a mask or a reticle, may be used to generate a circuit pattern to be formed on an individual layer of the IC. This pattern can be transferred onto a target portion (e.g. including part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Conventional lithographic apparatus include so-called steppers, in which each target portion is irradiated by exposing an entire pattern onto the target portion at once, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

A lithographic apparatus includes a plurality of movable objects which are to be accurately positioned with six degrees of freedom (in an XYZ coordinate system: x, y, z, Rx, Ry, Rz). Examples of such movable objects are a substrate stage and a reticle stage. The objects may be driven and positioned by controlled planar electric motors each comprising an essentially planar stator and a mover, where the mover is the part of the motor being generally translatable relative to the stator. The mover generally moves in a direction parallel to a plane of the stator, with a gap being present between the stator and the mover.

Planar motors may comprise permanent magnets in either the stator or the mover for generating a magnetic field in which current conducting coils in the other part, either the mover or the stator, generate a force for moving the stator and mover relative to each other. A planar motor of a known design has a back plate or similar structure, made from a magnetizable material, with a checkerboard pattern of alternating polarized permanent magnets mounted on the backplate as a first part, and a set of coils as a second part, where the first part and the second part are movable relative to each other. In the motor, a force parallel to an x-y plane in which the first part extends (hereinafter also indicated as a horizontal force), and the forces at right angles (z-direction) thereto (hereinafter also indicated as a vertical force), are generated by the currents in the coils, where a relation between the currents and the forces is an x and y position dependent function of the first part relative to the second part according to Equations [1]:

$$F_H = i \cdot \frac{3}{2} \cdot Km \cdot \cos(\phi)$$ [1]

and $$F_V = i \cdot \frac{3}{2} \cdot Km \cdot \sin(\phi)$$

wherein:
$F_H$ horizontal force
$F_V$ vertical force
i current
Km motor constant
$\phi$ commutation angle In the Equations [1], a motor constant Km appears which is, inter alia, determined by the coils' geometry and by the magnitude of the magnetic field generated by the permanent magnets of the planar motor.

A planar motor used in a lithographic apparatus, for example a planar long stroke motor used to drive a substrate stage, is designed to generate high acceleration forces, and to reach high velocities to maximize the throughput of the lithographic apparatus. This requires high currents to flow in the coils of such a motor, and the power dissipation in the coils of the motor consequently is high. During operation, a surface of the coils may heat up several tens of degrees. Primarily via heat conduction through a medium present in the gap between the coils and magnets, such as air, the magnets (which are facing the coils) may heat up several degrees when the coils heat up, depending on the way of cooling the coils and/or the magnets.

The magnetic field generated by the permanent magnets has a temperature sensitivity, and, as a consequence, a temperature change of the permanent magnets will lead to a change of the magnetic field, and thus a variation of the motor constant of the planar motor concerned. As an example, a temperature sensitivity of the permanent magnets may be in the order of e.g. −0.3%/K, where a temperature rise of several kelvin will lead to a loss of magnetic field of several percent. The temperature sensitivity thus may lead to appreciable errors in a control of the motor position, in particular of the feedforward control of the motor position.

SUMMARY

It is desirable to compensate for motor constant variations in the motor control system.

According to an embodiment of the invention, there is provided a lithographic apparatus including: an illumination system configured to condition a radiation beam; a patterning support constructed to hold a patterning device, the patterning device being capable of imparting the radiation beam with a pattern in its cross-section to form a patterned radiation beam; a substrate support constructed to hold a substrate; a projection system configured to project the patterned radiation beam onto a target portion of the substrate; and a positioning system to position the patterning support, the substrate support, or both the positioning system including a motor with a stator and a mover that is coupled to one of the patterning support and the substrate support, and an associated motor control system having a controller configured to provide an output to control a current applied to the motor, wherein the motor control system is configured to: (a) determine a controller output that is adapted to compensate for a weight of the mover and associated support; (b) determine a deviation of the output obtained under (a) from an output that is adapted to compensate the gravity force acting on the mover and associated support; and (c) correct the current applied to the motor on the basis of the deviation obtained under (b).

According to an embodiment of the invention, there is provided a positioning system including a motor with a stator and a mover that is coupled to an object, and an associated motor control system having a controller configured to provide an output to control a current applied to the motor, wherein the motor control system is configured to: (a) determine a controller output that is adapted to compensate for a weight of the mover and the object; (b) determine a deviation of the output obtained under (a) from an output that is adapted to compensate a gravity force acting on the mover and the object; and (c) correct the current applied to the motor based on the deviation obtained under (b).

According to an embodiment of the invention, there is provided a method of controlling a motor with a stator and a mover coupled to an object, including: (a) providing an output, by a controller, to control a current applied to the motor; (b) determining a controller output that is adapted to compensate for a weight of the mover and the object; (c) determining a deviation of the output obtained under (b) from an output that is adapted to compensate the gravity force acting on the mover and associated object; and (d) correcting the currents applied to the motor based on the deviation obtained under (c).

In an embodiment of the invention, there is provided a computer program including program instructions executable by a motor positioning system to control a planar motor with a stator and a mover coupled to an object, the motor positioning system having an associated motor control system having a controller configured to provide an output to control a current applied to the motor, the instructions upon execution instructing the motor positioning system to: (a) determine a controller output that is adapted to compensate for a weight of the mover and the object; (b) determine a deviation of the output obtained under (a) from an output that is adapted to compensate a gravity force acting on the mover and the object; and (c) correct the current applied to the motor based on the deviation obtained under (b).

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
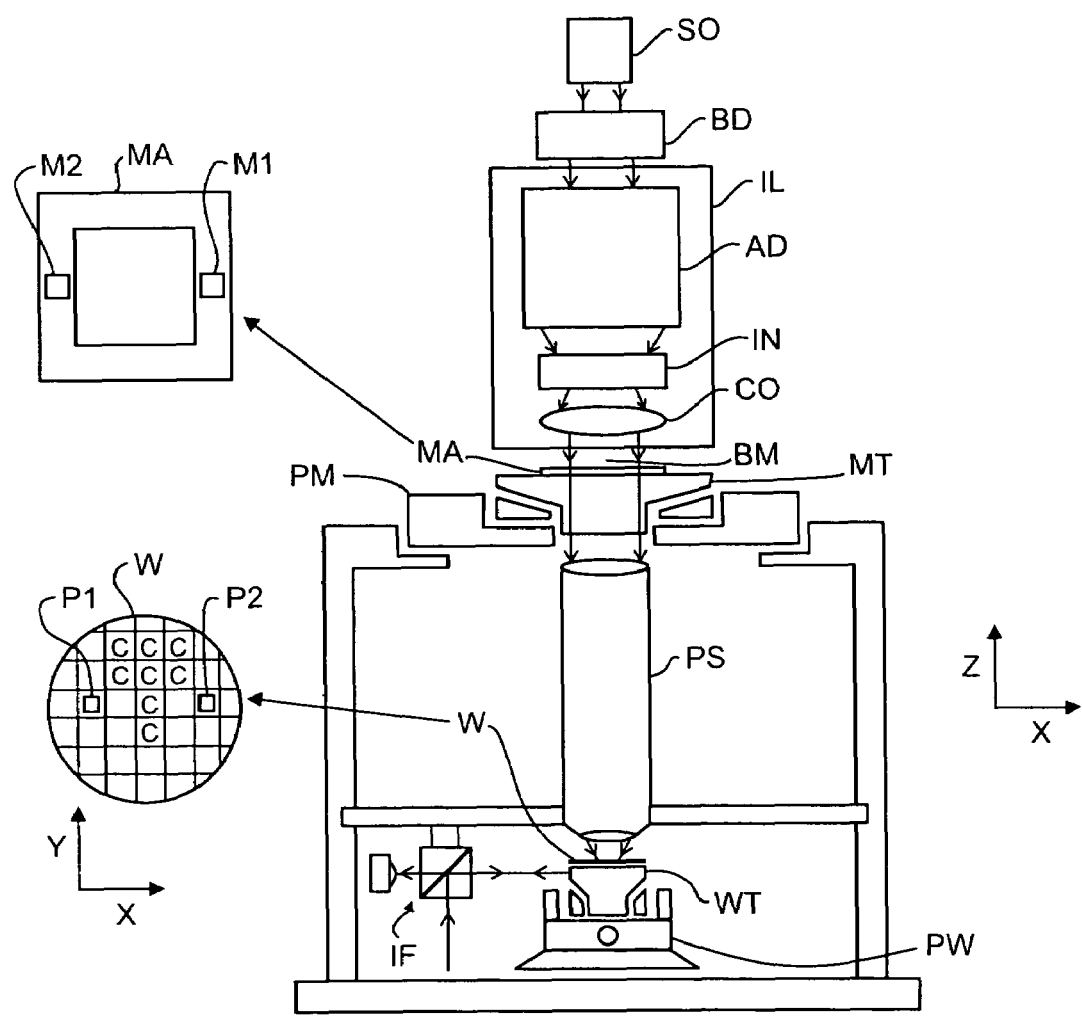
FIG. 1 depicts a lithographic apparatus according to an embodiment of the invention.

FIG. 1 schematically depicts a lithographic apparatus according to one embodiment of the invention. The apparatus includes an illumination system (illuminator) IL configured to condition a radiation beam BM (e.g. UV radiation or any other suitable radiation), a mask support structure (e.g. a mask table) MT constructed to support a patterning device (e.g. a mask) MA and connected to a first positioning device PM configured to accurately position the patterning device in accordance with certain parameters. The apparatus also includes a substrate table (e.g. a wafer table) WT or "substrate support" constructed to hold a substrate (e.g. a resist-coated wafer) W and connected to a second positioning device PW configured to accurately position the substrate in accordance with certain parameters. The apparatus further includes a projection system (e.g. a refractive projection lens system) PS configured to project a pattern imparted to the radiation beam BM by patterning device MA onto a target portion C (e.g. including one or more dies) of the substrate W.

The illumination system may include various types of optical components, such as refractive, reflective, magnetic, electromagnetic, electrostatic or other types of optical components, or any combination thereof, for directing, shaping, or controlling radiation.

The mask support structure supports, i.e. bears the weight of, the patterning device. It holds the patterning device in a manner that depends on the orientation of the patterning device, the design of the lithographic apparatus, and other conditions, such as for example whether or not the patterning device is held in a vacuum environment. The mask support structure can use mechanical, vacuum, electrostatic or other clamping techniques to hold the patterning device. The mask support structure may be a frame or a table, for example, which may be fixed or movable as required. The mask support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section so as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables or "substrate supports" (and/or two or more mask tables or "mask supports"). In such "multiple stage" machines the additional tables or supports may be used in parallel, or preparatory steps may be carried out on one or more tables or supports while one or more other tables or supports are being used for exposure.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques can be used to increase the numerical aperture of projection systems. The term "immersion" as used herein does not mean that a structure, such as a substrate, must be submerged in liquid, but rather only means that a liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD configured to adjust the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross-section.

The radiation beam BM is incident on the patterning device (e.g., mask MA), which is held on the mask support structure (e.g., mask table MT), and is patterned by the patterning device. Having traversed the mask MA, the radiation beam BM passes through the projection system PS, which focuses the beam onto a target portion C of the substrate W. With the aid of the second positioning device PW and position sensor IF (e.g. an interferometric device, linear encoder or capacitive sensor), the substrate table WT can be moved accurately, e.g. so as to position different target portions C in the path of the radiation beam BM. Similarly, the first positioning device PM and another position sensor (which is not explicitly depicted in FIG. 1) can be used to accurately position the mask MA with respect to the path of the radiation beam BM, e.g. after mechanical retrieval from a mask library, or during a scan. In general, movement of the mask table MT may be realized with the aid of a long-stroke module (coarse positioning) and a short-stroke module (fine positioning), which form part of the first positioning device PM. Similarly, movement of the substrate table WT or "substrate support" may be realized using a long-stroke module and a short-stroke module, which form part of the second positioning device PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The first positioning device PM and/or the second positioning device PW may be controlled using a control method and system according to embodiments of the present invention, as described further below with reference to FIGS. 2-7.

The depicted apparatus could be used in at least one of the following modes:

In step mode, the mask table MT or "mask support" and the substrate table WT or "substrate support" are kept essentially stationary, while an entire pattern imparted to the radiation beam is projected onto a target portion C at one time (i.e. a single static exposure). The substrate table WT or "substrate support" is then shifted in the X and/or Y direction so that a different target portion C can be exposed. In step mode, the maximum size of the exposure field limits the size of the target portion C imaged in a single static exposure.

In scan mode, the mask table MT or "mask support" and the substrate table WT or "substrate support" are scanned synchronously while a pattern imparted to the radiation beam is projected onto a target portion C (i.e. a single dynamic exposure). The velocity and direction of the substrate table WT or "substrate support" relative to the mask table MT or "mask support" may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

In another mode, the mask table MT or "mask support" is kept essentially stationary holding a programmable patterning device, and the substrate table WT or "substrate support" is moved or scanned while a pattern imparted to the radiation beam is projected onto a target portion C. In this mode, generally a pulsed radiation source is employed and the programmable patterning device is updated as required after each movement of the substrate table WT or "substrate support" or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

FIGS. 2-5 illustrate a six degrees of freedom (DoF), three phase planar motor.

Figure 2:
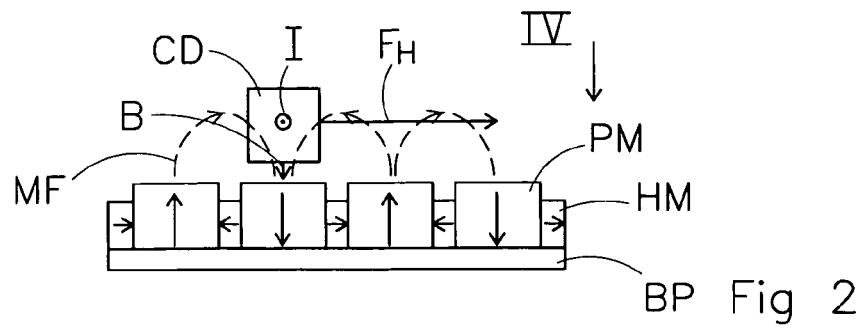
FIGS. 2 and 3 each schematically depict a cross-section according to plane II in FIG. 4 of a part of a planar motor in different operational states.

Referring to FIG. 2, a back plate BP of a magnetizable material carries a plurality of permanent magnets PM, where each permanent magnet PM is polarized in accordance with an arrow drawn therein. The permanent magnets PM are spaced from each other, and in the spaces between the permanent magnets PM permanent magnets HM (also referred to as Halbach magnets) are situated, polarized in accordance with an arrow drawn therein. A magnetic field generated by the assembly of permanent magnets PM is indicated with dashed arrows MF. A conductor CD carries a current I at right angles (or substantially perpendicular) to the plane of the Figure, directed towards the beholder. The direction of the magnetic field MF in the conductor CD is indicated with B. As a result of the current in the magnetic field MF, the conductor CD experiences a force as indicated by an arrow $F_H$. The force $F_H$ is also referred to as a horizontal force, which here merely means that the direction of the force $F_H$ is substantially parallel to a plane in which the back plate BP extends. Usually, although not necessarily, the latter plane extends substantially in the horizontal direction.

Figure 3:
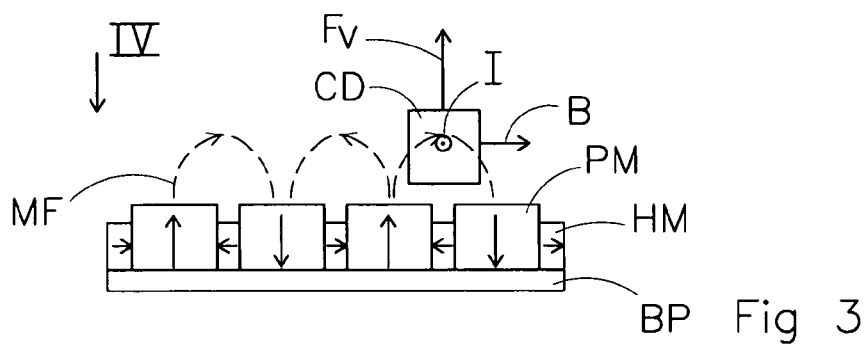

Referring to FIG. 3, the current-carrying conductor CD of FIG. 2 is situated at another location relative to the plurality of permanent magnets PM. As a result, a force as indicated by an arrow $F_V$ is exerted on the conductor CD. The force $F_V$ is also referred to as a vertical force, which here merely means that the direction of the force $F_V$ is at right angles (or substantially perpendicular) to a plane in which the back plate BP extends. As already stated above, usually, but not necessarily, the latter plane extends substantially in the horizontal direction.

Figure 4:
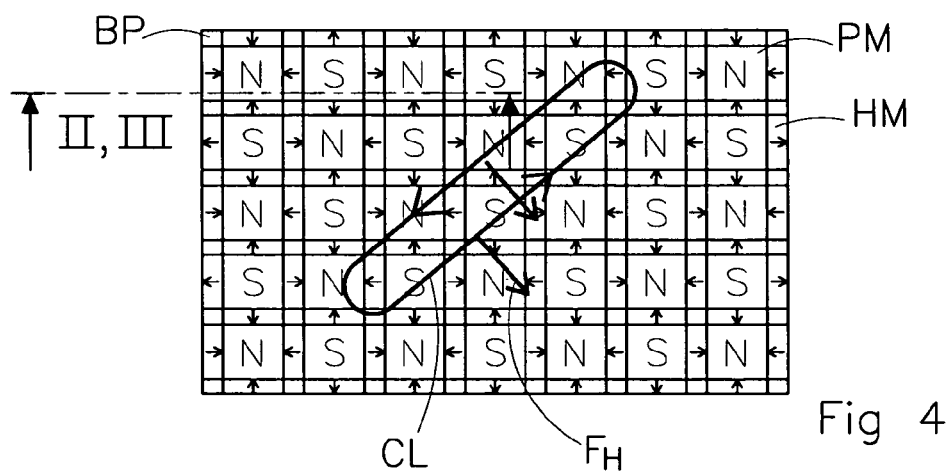
FIG. 4 shows a plan view of a planar motor with one coil schematically depicted above an array of permanent magnets.

FIG. 4 shows the plurality of permanent magnets PM and Halbach magnets HM arranged in a two-dimensional checkerboard array. A permanent magnet PM at the top left-hand position has a North pole N at its side shown, whereas the adjoining permanent magnets PM have a South pole S. A coil CL extending in a plane substantially parallel to a plane in which the back plate BP extends, and situated at a distance from the permanent magnets PM, has a current flowing in the direction indicated with the arrows drawn in the coil CL. From the above explanation in conjunction with FIG. 2, it will be appreciated that the coil CL experiences horizontal forces $F_H$ in the position relative to the array of permanent magnets PM as shown in FIG. 4.

Figure 5:
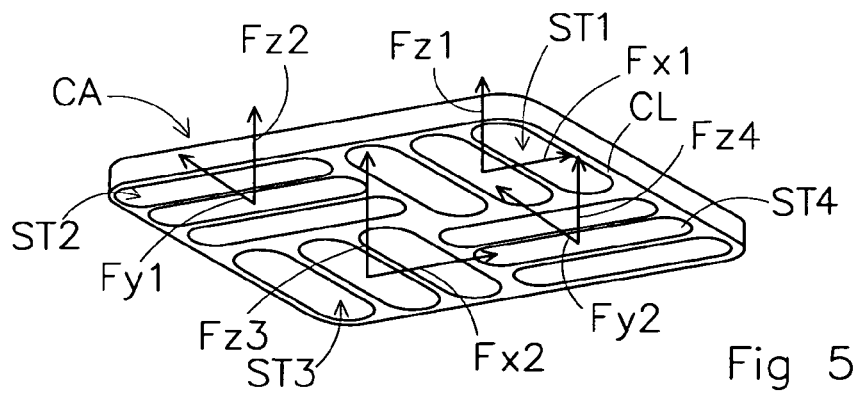
FIG. 5 shows a perspective view of a three phase coil structure for use in a planar motor.

Referring to FIG. 5, in an embodiment the coil CL forms part of a coil array CA including four sets ST1, ST2, ST3 and ST4 of three coils. The set ST1 includes three coils oriented in the same direction as the three coils of the set ST3, whereas the set ST2 includes three coils oriented in the same direction as the three coils of the set ST4. With an appropriate selection of currents flowing in the sets of coils, each set ST1, ST2, ST3 and ST4 generates a horizontal force and a vertical force. As an example, the set ST1 generates a horizontal force $F_H$ in an X direction Fx1 and a vertical force $F_V$ in a Z direction Fz1, the set ST2 generates a horizontal force $F_H$ in a Y direction Fy1 and a vertical force $F_V$ in a Z direction Fz2, the set ST3 generates a horizontal force $F_H$ in an X direction Fx2 and a vertical force $F_V$ in a Z direction Fz3, and the set ST4 generates a horizontal force $F_H$ in a Y direction Fy2 and a vertical force $F_V$ in a Z direction Fz4, as indicated in FIG. 5. Together with the magnet array shown in FIG. 4, the coil array CA constitutes a motor movable in six degrees of freedom. In the following, the magnet array will be indicated as a stator, and the coil array will be indicated as a mover.

For a constant coil current, the motor force is a sinusoidal position XY-dependent function (H in Equations [2] below) of a magnet commutation pitch P, which is equal to one diagonal North-South transition. The magnitude of horizontal $F_H$ and vertical $F_V$ forces is determined by a commutation phase angle $\phi$ and a motor constant Km given in Equations [2]:

Force to Current:

$$i = i(F_H, F_V) = \frac{1}{\frac{3}{2}} \cdot \sqrt{\left(\frac{F_H}{K_H}\right)^2 + \left(\frac{F_V}{K_V}\right)^2} = \frac{1}{\frac{3}{2} \cdot Km} \cdot \sqrt{(F_H)^2 + (F_V)^2}$$

-continued if $$K_H = K_V = Km$$

With $$H = x_1, x_2, y_1, y_2$$

and $$V = z_1, z_2, z_3, z_4$$

$$\phi = \phi(F_H, F_V) = \arctan\left(\frac{\frac{F_V}{K_V}}{\frac{F_H}{K_H}}\right) + \phi_o = \arctan\left(\frac{F_V}{F_H}\right) + \phi_o$$

if $$K_H = K_V = Km$$

Initial Commutation Offset:

$$\phi_o = 2\pi \cdot \frac{H_0}{P} \qquad [2]$$

with $$H = Xo, Yo$$

Just as in a classic 3-phase motor, the horizontal ($F_H$) and vertical ($F_V$) motor forces are generated by a motor constant Km that is X- or Y-position dependent sinusoidal function of the mover relative to the stator. The horizontal X,Y mover to stator position H is used for commutation with sinusoidal position dependent motor currents. Applying three such coils, each with 120 degrees phase shift in position and current, results in a constant motor force. The direction of the force is given by the (electric) commutation angle $\phi$. $\phi=0$ results in a pure horizontal force ($F_H$ not 0, $F_V=0$), $\phi=\pi/2$ results in a pure vertical force ($F_H=0$, $F_V$ not 0). By altering the commutation angle $\phi$ between 0 and $2\pi*Y/P$ [rad] in the motor, the ratio of the vertical and horizontal forces can be altered. The magnitude of the force is given by the magnitude of the current î in each coil.

Equations [2] represent the relation between horizontal forces $F_H$ and the vertical forces $F_V$, the current i and the commutation angle $\phi$. The motor constant Km as a function of position and the required 3-phase position dependent motor currents (R, S, T phases) are shown in Equations [3] and Equations [4], respectively, where $\phi_0$ indicates an initial commutation angle offset.

Km per coil: [3]

$$Km_R = Km \cdot \sin\left(2\pi \cdot \frac{H}{P} - \phi_0 - 0\right)$$

$$Km_S = Km \cdot \sin\left(2\pi \cdot \frac{H}{P} - \phi_0 - \frac{4}{3}*\pi\right)$$

$$Km_T = Km \cdot \sin\left(2\pi \cdot \frac{H}{P} - \phi_0 - \frac{8}{3}*\pi\right)$$

with $H = X, Y$

-continued

Currents: [4]

$$i_R = \hat{i} \cdot \sin\left(2\pi \cdot \frac{H}{P} + (\phi - \phi_0) - 0\right)$$

$$i_S = \hat{i} \cdot \sin\left(2\pi \cdot \frac{H}{P} + (\phi - \phi_0) - \frac{4}{3} \cdot \pi\right)$$

$$i_T = \hat{i} \cdot \sin\left(2\pi \cdot \frac{H}{P} + (\phi - \phi_0) - \frac{8}{3} \cdot \pi\right) \quad \{= -i_R - i_S\}$$

with $H = X, Y$

Combining Equations [3] and [4] results in the horizontal and vertical forces $F_H$ and $F_V$ according to Equations [5] (cf. Equations [1]):

Total Motor Forces:

$$F_R = \hat{i} \cdot \sin\left(2\pi \cdot \frac{H}{P} + (\phi - \phi_0) - 0\right) \cdot Km \cdot \sin\left(2\pi \cdot \frac{H}{P} - \phi_0 - 0\right) \quad [5]$$

$$F_S = \hat{i} \cdot \sin\left(2\pi \frac{H}{P} + (\phi - \phi_0) - \frac{4}{3} \cdot \pi\right) \cdot Km \cdot \sin\left(2\pi \cdot \frac{H}{P} - \phi_0 - \frac{4}{3} \cdot \pi\right)$$

$$F_T = \hat{i} \cdot \sin\left(2\pi \frac{H}{P} + (\phi - \phi_0) - \frac{8}{3} \cdot \pi\right) \cdot Km \cdot \sin\left(2\pi \cdot \frac{H}{P} - \phi_0 - \frac{8}{3} \cdot \pi\right)$$

$$F(\phi) = F_R + F_S + F_T = i \cdot \frac{3}{2} \cdot Km$$

$$F_H = i \cdot \frac{3}{2} \cdot Km \cdot \cos(\phi)$$

$$F_V = i \cdot \frac{3}{2} \cdot Km \cdot \sin(\phi)$$

From the Equations [5] it will be appreciated that there is a direct relationship between the (xy position dependent) motor constant Km and the horizontal and vertical forces generated by the motor. In turn, the motor constant Km depends on the coil geometry (in particular the number of turns thereof) and on the magnetic field generated by the permanent magnets PM, and again in turn, the magnetic field generated by the permanent magnets PM is a function of the temperature thereof. As a consequence, when the temperature of the permanent magnets PM increases during operation of the motor, the motor constant Km of the motor decreases, and the force generated by the motor decreases (when the current in the motor coils remains the same), thereby introducing an error in the motor control. In practice, the temperature of the permanent magnets PM will indeed increase during operation due to heat originating from the coils in the vicinity of the permanent magnets PM.

The variation of the motor constant Km caused by temperature variation of the permanent magnets of the motor is a relatively slow process. The thermal time constant is formed by a resistance R of the enclosed air between the coil array and the array of permanent magnets, and by the thermal capacity C of the array of permanent magnets and the back plate or similar structure on which the permanent magnets are mounted. A coarse (under) estimation of the time constant is several minutes. With an exposure time for one substrate in a lithographic apparatus in the order of seconds, the thermal effect is very slow when compared to the time to expose a single substrate. Further, it may be assumed that the thermal conductance of the permanent magnets and the back plate is relatively good and that their thermal capacity is relatively high, so that all magnets in a scan area will have a more or less uniform heating.

According to an embodiment of the present invention, after an initial calibration, the currents that are required to generate vertical forces $F_V$ (Fz) are used as a reference input in the motor control system for determining a change in motor constant originating from a temperature variation (or, for that matter, any other cause impacting the motor constant Km). Note that the vertical forces $F_V$ are required to lift the object being controlled. The currents required to generate vertical forces $F_V$ are well suited to be used as a reference input, since they basically originate from the force of gravity, which is a constant. As an example, if the motor constant Km decreases due to temperature effects, in the motor control system a controller controlling the vertical position of the object will increase the current applied to the (vertically acting) motor to keep the vertical position of the object constant. This current generated by the controller can be used to correct for changes in the horizontal motor constant. More generally, measuring the currents required to generate vertical forces allows for the use of one parameter to correct all (possibly position dependent) motor constants Km. The currents required to generate vertical forces $F_V$ may be measured during constant (horizontal) velocity of the motor. During constant velocity of the motor, the forces on the moving part of the motor are: the gravity force which is constant, eddy current damping, and some parasitic forces from a cable slab (if the moving part requires such a slab, e.g. if the moving part includes coils which are fed with current and cooling fluid).

Figure 6:
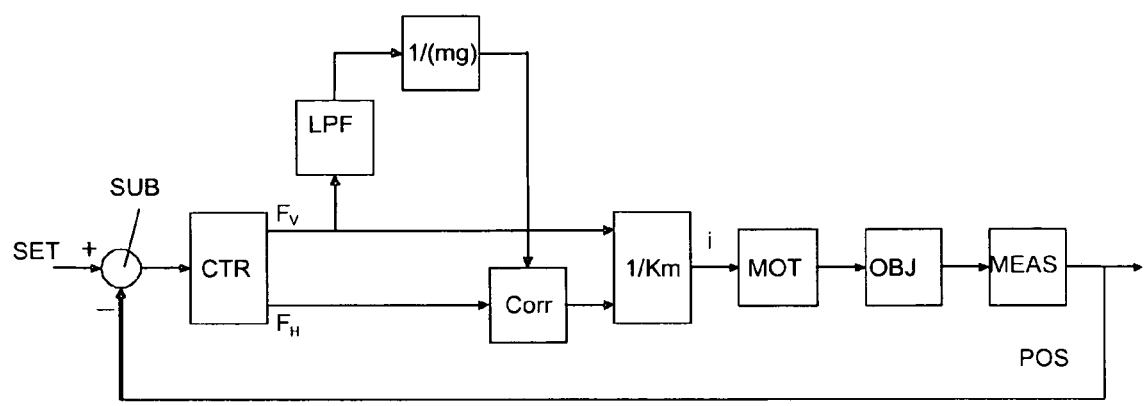
FIG. 6 shows a simplified block diagram of a motor control system according to an embodiment of the invention.

FIG. 6 diagrammatically depicts a simplified motor control system, processing signals for horizontal and vertical actuation in accordance with an embodiment of the invention. It is noted that the system is represented in simple form, where in reality several signals are processed in parallel. A setpoint SET, containing a horizontal desired position and a vertical desired position, is input into a subtractor SUB. From the setpoint SET, the actual horizontal and vertical measured positions POS are subtracted in the subtractor SUB. The difference between the setpoint SET and the measured positions POS is input into a controller CTR. Controller CTR generates required forces for causing the difference between the setpoint SET and the actual measured positions POS to decrease. In FIG. 6, the controller CTR has two outputs $F_H$ and $F_V$, corresponding to the required horizontal and vertical force, respectively. The vertical force $F_V$ is low-pass filtered by a low-pass filter LPF, and divided by product (m*g) of object mass m (including the mass of the movable part of the motor MOT) and the gravity constant g. The outcome of this division is used as a correction factor Corr for $F_H$. If the motor constant Km has its nominal value, $F_V$ divided by (m*g) will be equal to 1. However, if the controller CTR generates a vertical force $F_V$ that is larger than a nominal force required to lift the object by the motor MOT, this indicates that the actual motor constant is smaller than its nominal value. In that case, the output of the division by (m*g) produces a value larger than 1. The horizontal control force FH is multiplied by this correction factor Corr to compensate for the smaller motor constant. After correction, both $F_H$ and $F_V$ are divided by the nominal motor constant Km to generate a current i that is input into the motor. The motor MOT generates a force in response to the current i, that is used to move the object OBJ. The actual positions POS of the object in horizontal and vertical direction are measured by measurement system MEAS, and fed back to the subtractor SUB. Note that the FIG. 6 is simplified in that it does not, for example, show any feedforward path or decoupling, nor does it show a control for other degrees of freedom.

Figure 7:
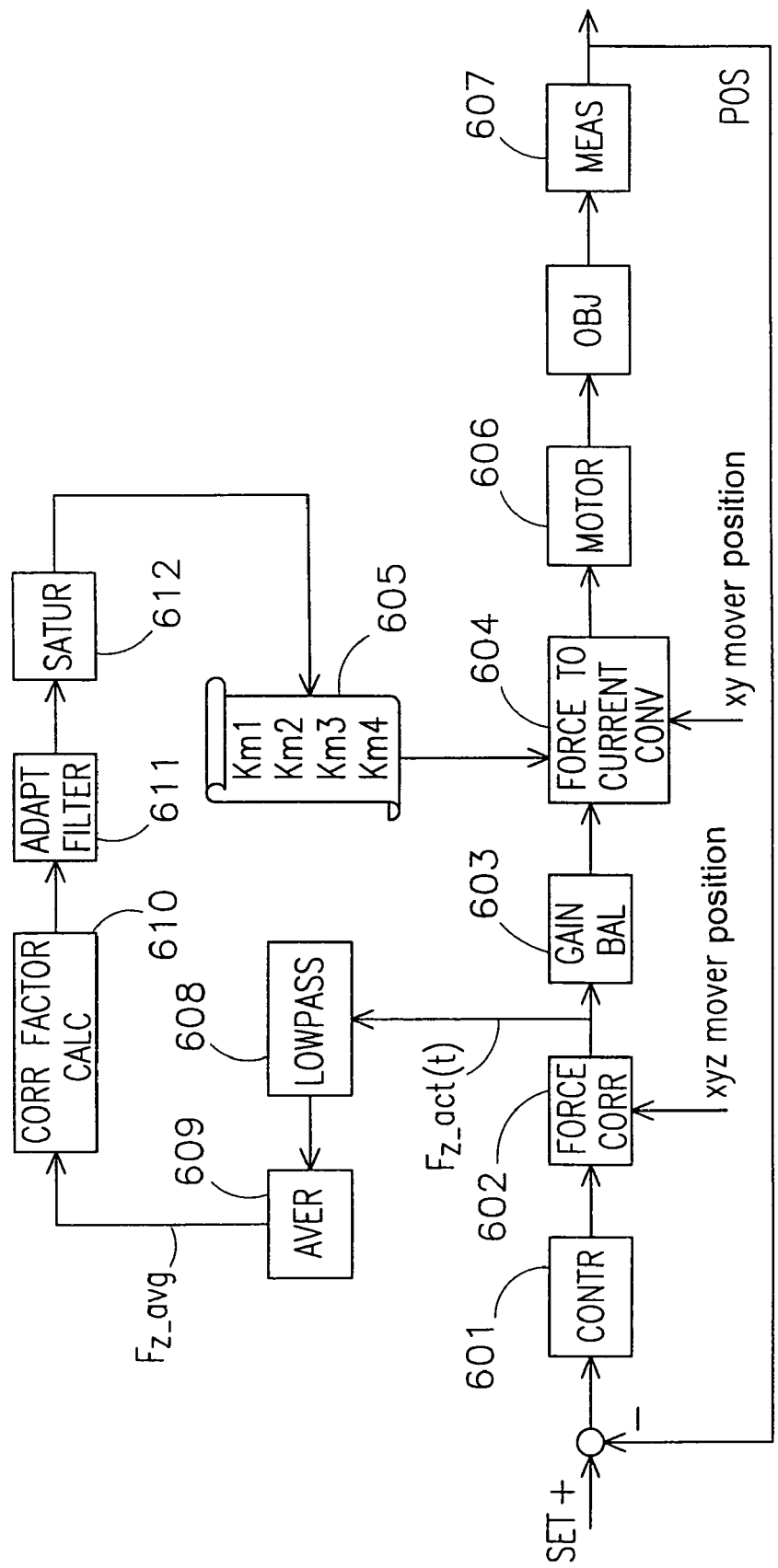
FIG. 7 shows a block diagram of a further embodiment of a motor control system according to an embodiment of the invention.

FIG. 7 diagrammatically depicts a more elaborate motor control system in accordance with an embodiment of the invention. A setpoint signal is fed to a controller 601, which may include feedback and feedforward control paths in a manner known per se. The controller output is input to a force corrector 602, where e.g. position dependent parasitic effects in the motor are corrected. Also the XYZ mover (relative to stator) position is input to the force corrector 602. The output from the force corrector 602 is input to a gain balancer 603. The gain balancer 603 transforms the logical control forces to force command setpoints for each of the four coils in the mover of a planar motor. The output from the gain balancer 603 is input to a force to current converter 604 that calculates correct three-phase motor currents needed for commutation. Also the XY mover (relative to stator) position is input to the force to current converter 604. As a basis for its calculations, the force to current converter 604 uses four two-dimensional tables Km1, Km2, Km3 and Km4 storing position dependent motor constants Km in a memory 605. The output current of the force to current converter 604 is fed to the physical motor 606, which is coupled to an object OBJ to be moved that is measured by a measurement system 607. An output POS of the measurement system 607 is fed back to the controller 601.

An output of the force corrector 602 provides an actual vertical force signal as a function of time Fz_act(t). This signal is input to an optional lowpass filter 608 to remove unwanted frequencies from the signal. An output of the lowpass filter 608 is input to an averager 609 which outputs an average force signal Fz_avg to a correction factor calculator 610. An output from the correction factor calculator 610 is input to an optional adaptive filter 611. An output from the adaptive filter 611 is input to an optional saturator 612 in which the correction signal is compared with predetermined minimum and maximum values. In the saturator 612, if the correction signal is higher than the maximum value, then the correction signal is set to the maximum value. If the correction signal is lower than the minimum value, the correction signal is set to the minimum value. An output from the saturator 612 is used to update the motor constant tables Km1, Km2, Km3 and Km4 in the memory 605.

An online adaptive calibration procedure for the motor depicted in FIGS. 2-5, and according to the control system of FIG. 7, may thus include the following acts:

(a) Assume four (Km1, Km2, Km3, Km4) large two-dimensional tables (XY) with position dependent motor constants, one table for each three phase coil set, the motor constants having been calibrated previously by a high precision calibration procedure;

(b) During a normal moving operation of the motor, trace the Fz(t) output force from a Force Corrector of the motor control system as a function of time. Store only the Fz(t) data during the constant velocity trajectory. In a lithographic apparatus, use all Fz(t) data for each die on a complete substrate;

(c) (Optional) Perform a Low Pass filtering of the Fz(t) data;

(d) Calculate an average of the force: Fz_avg=avg{Fz(t)};

(e) Calculate a global correction factor Corr for the motor constant: Corr=m*g/Fz_avg;

(f) Apply an adaptive filtering that ensures stability of an adaptive loop in the control system;

(g) (Optional) Check the new correction factor Corr against realistic minimum and maximum values, saturate if the calculated value exceeds the minimum or maximum values, and generate warnings or emergencies if applicable;

(h) Update the motor constants in the motion controller of the motor control system Km=Km(x,y)*Corr;

(i) Repeat from step (b).

It is noted that the motor constant Km is used both in the generation of horizontal forces and in the generation of vertical forces, which implies that knowledge of a variation of the vertical force Fv (Fz) also provides knowledge of the variation of the horizontal force $F_H$.

In practice, in a lithographic apparatus, the motor constant update procedure will have a time varying update rate which depends on the particular job in the lithographic apparatus (e.g. different substrates, different dies on substrates). Also in practice, in a lithographic apparatus, the vertical force data will be generated at varying positions of the mover relative to the stator of the motor, again depending on the particular job in the lithographic apparatus.

It is to be noted that the present invention is not limited to long stroke planar motors, but also finds an application in short stroke motors. In short stroke single phase Lorentz motors, there is only one vertical force per vertical motor.

It is also noted that in an actual motor, the sinusoidal functions that are used to calculate the values of the currents through the motor coils, may be replaced by another function, or may include higher harmonics, or may be replaced by a table that holds the current values as a function of the motor position.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

It will further be appreciated that the invention may applied to other apparatus that lithographic apparatus, and thus may be applied in a general motor control system and method.

The descriptions above are intended to be illustrative, not limiting. Thus, it will be apparent to one skilled in the art that modifications may be made to the invention as described without departing from the scope of the claims set out below.

What is claimed is:

1. A lithographic apparatus, comprising:
    an illumination system configured to condition a radiation beam;
    a patterning support constructed to hold a patterning device, the patterning device being capable of imparting the radiation beam with a pattern in its cross-section to form a patterned radiation beam;
    a substrate support constructed to hold a substrate;
    a projection system configured to project the patterned radiation beam onto a target portion of the substrate; and
    a positioning system to position the patterning support, the substrate support, or both, the positioning system comprising a motor with a stator and a mover that is coupled to one of the patterning support and the substrate support, and an associated motor control system having a controller configured to provide an output to control a current applied to the motor,
    wherein the motor control system is configured to:
        (a) determine a controller output that is adapted to compensate for a weight of the mover and associated support;
        (b) determine a deviation of the output obtained under (a) from an output that is adapted to compensate a gravity force acting on the mover and associated support;
        (c) correct the current applied to the motor based on the deviation obtained under (b), and
        (d) compare in (b) the deviation with a threshold value, the motor control system being configured such that, if the deviation exceeds the threshold value, (c) is not performed.

2. The lithographic apparatus of claim 1, wherein the motor is a planar motor.

3. The lithographic apparatus of claim 1, wherein the motor is a reluctance type motor.

4. The lithographic apparatus of claim 1, wherein the motor is a Lorentz type motor.

5. The lithographic apparatus of claim 1, wherein the motor control system is configured to determine in (a) the controller output as a function of time.

6. The lithographic apparatus of claim 1, wherein the motor control system is configured to determine the controller output in (a) when the mover has a substantially constant speed relative to the stator.

7. The lithographic apparatus of claim 1, wherein the motor control system is configured to determine in (a) the controller output in at least one of a plurality of coils of the mover.

8. The lithographic apparatus of claim 1, wherein the motor control system includes a low pass filter that is used in determining the controller output.

9. The lithographic apparatus of claim 1, wherein the motor control system includes an average unit that is used in determining the controller output.

10. A lithographic apparatus comprising:
    an illumination system configured to condition a radiation beam;
    a patterning support constructed to hold a patterning device, the patterning device being capable of imparting the radiation beam with a pattern in its cross-section to form a patterned radiation beam;
    a substrate support constructed to hold a substrate;
    a projection system configured to project the patterned radiation beam onto a target portion of the substrate; and
    a positioning system to position the patterning support, the substrate support, or both, the positioning system comprising a motor with a stator and a mover that is coupled to one of the patterning support and the substrate support, and an associated motor control system having a controller configured to provide an output to control a current applied to the motor,
    wherein the motor control system is configured to:
        (a) determine a controller output that is adapted to compensate for a weight of the mover and associated support;
        (b) determine a deviation of the output obtained under (a) from an output that is adapted to compensate a gravity force acting on the mover and associated support;
        (c) correct the current applied to the motor based on the deviation obtained under (b), and
        (d) compare in (b) the deviation with a threshold value, wherein the motor control system is configured such that, if said deviation exceeds said threshold value, said deviation is set equal to said threshold value.

11. A positioning system, comprising:
    a motor with a stator and a mover that is coupled to an object, and
    an associated motor control system having a controller configured to provide an output to control a current applied to the motor,
    wherein the motor control system is configured to:
        (a) determine a controller output that is adapted to compensate for a weight of the mover and the object;
        (b) determine a deviation of the output obtained under (a) from an output that is adapted to compensate a gravity force acting on the mover and the object; and
        (c) correct the current applied to the motor based on the deviation obtained under (b),
    wherein the motor control system is configured to compare in (b) the deviation with a threshold value, the motor control system being configured such that, if the deviation exceeds the threshold value, (c) is not performed.

12. The positioning system of claim 11, wherein the motor control system is configured to determine in (a) the controller output as a function of time.

13. The positioning system of claim 11, wherein the motor control system is configured to determine the controller output in (a) when the mover has a substantially constant speed relative to the stator.

14. A method of controlling a motor with a stator and a mover that is coupled to an object, the method comprising:
   (a) providing an output, by a controller, to control a current applied to the motor;
   (b) determining a controller output that is adapted to compensate for a weight of the mover and the object;
   (c) determining a deviation of the output obtained under (b) from an output that is adapted to compensate a gravity force acting on the mover and the object;
   (d) correcting the current applied to the motor based on the deviation obtained under (c), and
   (e) comparing in (b) the deviation with a threshold value, wherein, if the deviation exceeds the threshold value, (c) is not performed.

15. The method of claim 14, further comprising determining the controller output as a function of time.

16. The method of claim 14, wherein the controller output is determined when the mover has a substantially constant speed relative to the stator.

17. A computer program including program instructions executable by a motor positioning system to control a planar motor with a stator and a mover coupled to an object, the motor positioning system having an associated motor control system having a controller configured to provide an output to control a current applied to the motor, said instructions upon execution instructing the motor positioning system to:
   (a) determine a controller output that is adapted to compensate for a weight of the mover and the object;
   (b) determine a deviation of the output obtained under (a) from an output that is adapted to compensate a gravity force acting on the mover and the object; and
   (c) correct the current applied to the motor based on the deviation obtained under (b), and
   (d) compare in (b) the deviation with a threshold value, wherein, if the deviation exceeds the threshold value, (c) is not performed.

18. The computer program of claim 17, wherein the instructions upon execution instruct the motor positioning system to determine the controller output as a function of time.

19. The computer program of claim 17, wherein the controller output is determined when the mover has a substantially constant speed relative to the stator.

* * * * *